United States Patent
Du et al.

(10) Patent No.: US 11,374,897 B2
(45) Date of Patent: Jun. 28, 2022

(54) CANDC DOMAIN NAME ANALYSIS-BASED BOTNET DETECTION METHOD, DEVICE, APPARATUS AND MEDIUM

(71) Applicant: SHENZHEN LEAGSOFT TECHNOLOGY CO., LTD., Shenzhen (CN)

(72) Inventors: Ming Du, Shenzhen (CN); Dazhi Tu, Shenzhen (CN); Xincheng Wang, Shenzhen (CN)

(73) Assignee: SHENZHEN LEAGSOFT TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/958,747

(22) PCT Filed: Jul. 18, 2018

(86) PCT No.: PCT/CN2018/009610
§ 371 (c)(1),
(2) Date: Jun. 29, 2020

(87) PCT Pub. No.: WO2019/136953
PCT Pub. Date: Jul. 18, 2019

(65) Prior Publication Data
US 2020/0396201 A1     Dec. 17, 2020

(30) Foreign Application Priority Data
Jan. 15, 2018 (CN) .......................... 201810036078.7

(51) Int. Cl.
*G06F 15/16* (2006.01)
*H04L 61/4511* (2022.01)
(Continued)

(52) U.S. Cl.
CPC ............ *H04L 61/1511* (2013.01); *G06N 3/02* (2013.01); *G06N 7/005* (2013.01); *H04L 63/1491* (2013.01)

(58) Field of Classification Search
CPC ............. H04L 61/1511; H04L 63/1491; H04L 63/1425; H04L 2463/144; G06N 3/02; G06N 7/005; G06N 3/084
See application file for complete search history.

(56) References Cited

U.S. PATENT DOCUMENTS

2017/0171244 A1* 6/2017 Vissamsetty ........ H04L 63/1425
2018/0027416 A1* 1/2018 Bickford ............. H04L 63/1425
                                                                    726/23
2018/0357552 A1* 12/2018 Campos ................. G06N 5/043

FOREIGN PATENT DOCUMENTS

CN          101741862 A         6/2010
CN          103152442 A    *    6/2013
(Continued)

*Primary Examiner* — Anh Nguyen

(57) ABSTRACT

The invention provides a command-and-control (C&C) domain name analysis-based botnet detection method, device, apparatus and medium. The method includes an information acquisition step where DNS logs are acquired; a domain name analysis step where C&C domain names in the DNS logs are detected and the category of each C&C domain name is determined according to a pre-built domain name analyzer; a botnet determination step where whether a botnet exists is determined according to the C&C domain name and the category of C&C domain name. In the C&C domain name analysis-based botnet detection method, device, apparatus and medium provided by the present invention, by analyzing the domain name system (DNS) logs, the C&C domain name used in the attack activity is extracted for further analysis of the types of parasitic Trojans to thereby lock down the bot that the C&C server has controlled. In addition, the botnet activity trend can be (Continued)

analyzed by analyzing the Poisson parameter of each type of the C&C domain name, so as to form effective suppression measures in time.

7 Claims, 6 Drawing Sheets

(51) Int. Cl.
 *G06N 3/02* (2006.01)
 *G06N 7/00* (2006.01)
 *H04L 9/40* (2022.01)

(56) References Cited

FOREIGN PATENT DOCUMENTS

| | | |
|---|---|---|
| CN | 103152442 A | 6/2013 |
| CN | 106453412 A | 2/2017 |
| CN | 108156174 A | 6/2018 |
| WO | 2017223342 A1 | 12/2017 |

* cited by examiner

CANDC DOMAIN NAME ANALYSIS-BASED BOTNET DETECTION METHOD, DEVICE, APPARATUS AND MEDIUM

RELATED APPLICATIONS

The application is a national phase application of the International Application PCT/CN2018/096107 filed Jul. 18, 2018, which claims the benefit of the Chinese Patent Application CN201810036078.7 filed Jan. 15, 2018, each of which is incorporated herein by reference in its entirety.

FIELD OF THE INVENTION

The present invention relates to the technical field of network security, in particular to a C&C domain name analysis botnet detection method, device, apparatus and medium.

BACKGROUND OF THE INVENTION

A botnet refers to a network composed of one-to-many command-and-control channels for an attacker or botmaster to spread bot programs to control a large number of hosts, thereby achieving the purposes of sending control instructions to controlled computers and instructing parasitic Trojans to perform predetermined malicious actions. A controlled computer is called a zombie host or bot for short. FIG. 1 is a structural diagram of a botnet.

At present, the botnet detection technology mainly involves intrusion detection system (IDS), honeypot technology and network traffic analysis.

(1) The IDS monitors the operation status of a network or system by a configured security strategy, so as to detect various attack activities as much as possible and lock down infected hosts in time to ensure the confidentiality and reliability of the network system resources. However, the IDS is suitable for LAN and can only find the detected botnets.

(2) The honeypot technology can induce an attack by a deliberately arranged attack target, and track how an attack is implemented and analyze the relationship between the attackers upon an attacker intrusion, to thereby obtain their social network. However, the honeypot technology requires a lot of deployment and can be easily controlled as springboard for attack.

(3) The network traffic analysis is performed by analyzing behavior characteristics of bots in the botnet based on the Internet Relay Chat (IRC) protocol to classify the bots into two types, i.e. idling-for-long-time type and quick-joining type. Specifically, the bots have three obvious behavior characteristics in the botnet. The first behavior characteristic involves bot programs spread by worms, and a large number of computers infected with them will join the same IRC server within short time; as for the second behavior characteristic, the bots generally keep online for long time; and the third behavior characteristic is manifested by the fact that the bots as IRC users keep silent and idle for long time in the chat channel. Part of the bots can be found by traffic analysis, but no traffic/random operation state of the network can be generated due to a failure in the resolution of most malicious domain names randomly generated by a command-and-control server (C&C server). As a result, it is difficult to accurately lock down the bots in the whole Internet and locate the botnet in time.

In conclusion, existing botnet monitoring technologies are unable to capture attack behaviors, lock down bots and locate botnets in time.

SUMMARY OF THE INVENTION

It is an object of the present invention to provide a C&C domain name analysis-based botnet detection method, device, apparatus and medium. By analyzing the domain name system (DNS) logs, the C&C domain name used in the attack activity is extracted for further analysis of the types of parasitic Trojans to thereby lock down the bot that the C&C server has controlled. In addition, the botnet activity trend can be analyzed by analyzing the Poisson parameter of each type of the C&C domain name, so as to form effective suppression measures in time.

According to a first aspect, embodiments of the present invention provide a C&C domain name analysis-based botnet detection method, which includes an information acquisition step, where DNS logs are acquired; a domain name analysis step, where C&C domain names in the DNS logs are detected and the category of each C&C domain name is determined according to a pre-built domain name analyzer; and a botnet determination step, where whether a botnet exists is determined according to the C&C domain name and the category of C&C domain name.

The method further includes a data statistical step, where the occurrence frequency of each type of the C&C domain name is counted; and a trend determination step where the botnet activity trend is determined according to the occurrence frequencies of all types of the C&C domain names so as to assist in formation of effective suppression measures in time.

Further, the trend determination step includes substituting the occurrence frequency of each type of the C&C domain name into a Poisson distribution probability function to obtain a Poisson parameter of the corresponding category; determining all the Poisson parameters as a measure of botnet activity; and determining the botnet activity trend according to the measure of botnet activity.

Further, a training process of the domain name analyzer includes cleaning legitimate domain names published by legitimate websites to obtain a legitimate domain name set; generating a C&C domain name set by a public domain name generation algorithm and classifying and tagging each domain name in the C&C domain name set; statistically analyzing the structure of each domain name in the legitimate domain name set and the C&C domain name set, and establishing a character probability dictionary for each type of domain names; randomly selecting a given number of legitimate domain names from the legitimate domain name set to obtain a legitimate domain name training sample set; randomly selecting a given number of C&C domain names from the C&C domain name set to obtain a C&C domain name training sample set; and training the domain name analyzer according to the legitimate domain name training sample set, the C&C domain name training sample set and the character probability dictionary.

Further, the domain name analyzer is a neural network model based on a cumulative BP (i.e., backpropagation) algorithm, and the neutral network model is provided with a regularization item that comprehensively considers empirical error factors and network complexity factors.

Further, the calculation steps of the neutral network model based on the cumulative BP algorithm include calculating an error target function; describing the neutral network complexity; estimating model parameters by a cross validation process; and adjusting parameters by stochastic gradient descent to approximate the global minimum solution of the error function.

Further, the domain name analysis step includes extracting a domain name from the DNS logs; subjecting the domain name to feature extraction; determining whether the domain name is a C&C domain name according to the character probability dictionary; subjecting the C&C domain name to domain name feature quantification to obtain the classification number of the C&C domain name; and determining the category of the C&C domain name according to the classification number.

According to a second aspect, embodiments of the present invention provide a C&C domain name analysis-based botnet detection device, which comprises an information acquisition unit for acquiring DNS logs; a domain name analysis unit for detecting C&C domain names in the DNS logs and determining the category of each C&C domain name according to a pre-built domain name analyzer; and a botnet determination unit for determining whether a botnet exists according to the C&C domain name and the category of the C&C domain name.

According to a third aspect, embodiments of the present invention provide a computer apparatus, comprising at least one processor, at least one memory and computer program instructions stored in the memory. When the computer program instructions are executed by the processor, the method in the embodiments mentioned in the first aspect is implemented.

According to a fourth aspect, embodiments of the present invention provide a computer readable storage medium where the computer program instructions are stored. When the computer program instructions are executed by the processor, the method in the embodiments mentioned in the first aspect is implemented.

In the C&C domain name analysis-based botnet detection method, device, apparatus and medium provided in the embodiments of the present invention, by analyzing the DNS logs, the C&C domain name used in the attack activity is extracted for further analysis of the types of parasitic Trojans to thereby lock down the bot that the C&C server has controlled. In addition, the botnet activity trend can be analyzed by analyzing the Poisson parameter of each type of the C&C domain name, so as to form effective suppression measures in time.

The embodiments of the present invention can effectively prevent C&C domain names from bypassing blacklist detection; can capture attack behaviors in time in case of no attack flow generated due to a failure in domain name resolution after a C&C attack is launched in a network; and can analyze the occurrence frequency and Poisson parameter of a C&C domain name to obtain the botnet activity trend under the condition that the C&C server controls part of the bots, so as to facilitate formation of effective suppression measures.

DETAILED DESCRIPTION OF THE EMBODIMENTS

Hereinafter, the present invention is further illustrated by specific embodiments. However, it should be understood that these embodiments are only used for more detailed and specific explanations and should not be construed as limitations to the present invention in any form.

Example 1

Figure 1:
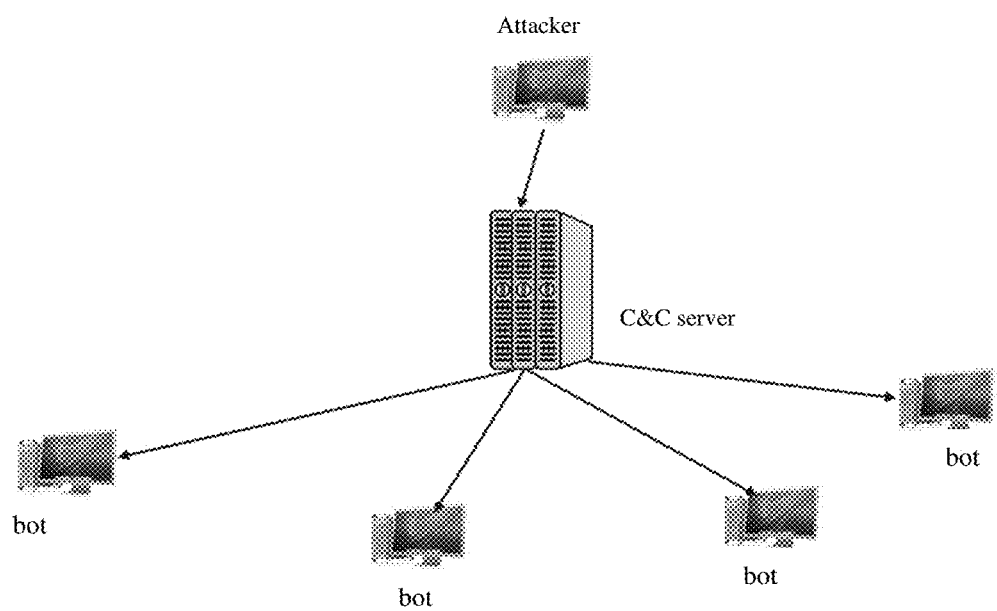
FIG. 1 is a structural diagram of a botnet in prior arts.
Figure 2:
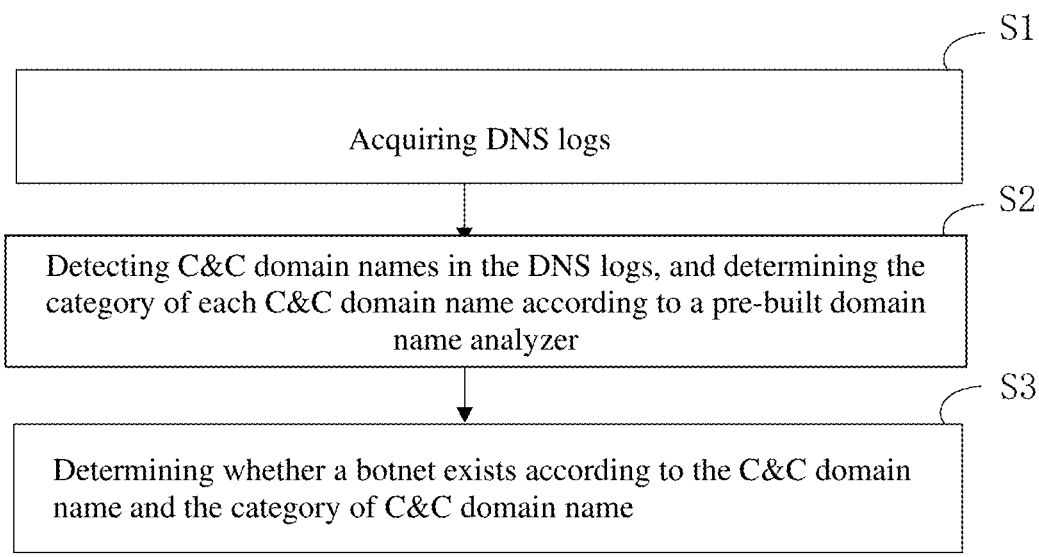
FIG. 2 is a flowchart of the method provided by embodiments of the present invention.

With reference to FIG. 2, a C&C domain name analysis-based botnet detection method in the example includes an information acquisition step S1, where DNS logs are acquired; a domain name analysis step S2, where C&C domain names in the DNS logs are detected and the category of each C&C domain name is determined according to a pre-built domain name analyzer; and a botnet determination step S3, where whether a botnet exists is determined according to the C&C domain name and the category of C&C domain name.

In the C&C domain name analysis-based botnet detection method in the example, by analyzing the DNS logs, the C&C domain name used in the attack activity is extracted for further analysis of the types of parasitic Trojans to thereby lock down the bot that the C&C server has controlled. In the example, the format of the DNS logs is specifically shown in Table 1.

TABLE 1

| | | DNS logs | | |
|---|---|---|---|---|
| Time | Apparatus IP address | Doman name | Response IP address | TTL |
| 2017-12-12 08:12:15.386 | 192.168.2.14 | mbd.baidu.com | 14.251.177.166 | 55 |
| 2017-12-12 08:12:15.889 | 192.168.2.19 | news.ifeng.com | 125.90.47.177 | 55 |
| 2017-12-12 08:12:16.231 | 192.168.2.110 | www.78.cn | 183.6.224.102 | 55 |
| 2017-12-12 08:12:17.001 | 192.168.2.118 | www.ggspyfmreouxnhqi.com | Null | 0 |
| 2017-12-12 08:12:17.653 | 192.168.2.118 | www.wyuhdsdttczd.com | Null | 0 |
| 2017-12-12 08:12:17.967 | 192.168.2.118 | mail.pivzovznpssx.com | Null | 0 |

TABLE 1-continued

DNS logs

| Time | Apparatus IP address | Doman name | Response IP address | TTL |
|---|---|---|---|---|
| 2017-12-12 08:12:18.862 | 192.168.2.118 | www.swtjyuhuefvl.com | Null | 0 |
| 2017-12-12 08:12:19.768 | 192.168.2.118 | www.zrkdvzjhse.com | Null | 0 |
| 2017-12-12 08:12:20.662 | 192.168.2.118 | www.wyuhdsdttczd.com | Null | 0 |
| 2017-12-12 08:12:21.524 | 192.168.2.19 | www.rauggyguyp.com | 208.100.26.251 | 235 |
| 2017-12-12 08:12:22.325 | 192.168.2.118 | www.furiararji.com | Null | 0 |
| 2017-12-12 08:12:23.219 | 192.168.2.118 | www.pibqzedhzwt.com | Null | 0 |
| 2017-12-12 08:12:24.165 | 192.168.2.118 | www.xjjcditjfkgkihfe.com | Null | 0 |
| 2017-12-12 08:12:24.981 | 192.168.2.14 | tech.meituan.com | 103.37.152.63 | 41 |
| 2017-12-12 08:12:25.824 | 192.168.2.19 | www.iteblog.com | 123.206.77.132 | 53 |
| 2017-12-12 08:12:26.585 | 192.168.2.110 | guanjia.qq.com | 14.215.138.13 | 55 |
| 2017-12-12 08:12:27.186 | 192.168.2.118 | en.wikipedia.org | 198.35.26.96 | 51 |
| 2017-12-12 08:12:28.115 | 192.168.2.118 | www.johannesbader.ch | 162.254.250.112 | 44 |
| 2017-12-12 08:12:29.023 | 192.168.2.14 | us.norton.com | 23.193.116.250 | 53 |
| 2017-12-12 08:12:29.829 | 192.168.2.118 | www.swtjyuhuefvl.com | Null | 0 |
| 2017-12-12 08:12:30.691 | 192.168.2.110 | spark.apache.org | 195.154.151.36 | 50 |
| 2017-12-12 08:12:31.551 | 192.168.2.110 | www.cnblogs.com | 101.37.113.127 | 40 |
| 2017-12-12 08:12:32.384 | 192.168.2.14 | blog.csdn.net | 47.95.165.112 | 35 |
| 2017-12-12 08:12:33.168 | 192.168.2.19 | baike.baidu.com | 180.149.131.247 | 54 |
| 2017-12-12 08:12:34.069 | 192.168.2.118 | www.jsntwyjcv.com | Null | 0 |
| 2017-12-12 08:12:35.011 | 192.168.2.118 | app.tanwan.com | 113.96.154.108 | 55 |
| 2017-12-12 08:12:35.892 | 192.168.2.110 | www.icbc.com.cn | 14.119.125.23 | 55 |
| 2017-12-12 08:12:36.721 | 192.168.2.118 | www.miercn.com | 113.96.154.108 | 55 |
| 2017-12-12 08:12:37.259 | 192.168.2.14 | zs.91.com | 125.77.24.228 | 53 |
| 2017-12-12 08:12:38.172 | 192.168.2.118 | www.xjjcditjfkgkihfe.com | Null | 0 |

In the example, domain name analysis is performed according to the logs as shown in Table 1 to obtain a domain name detection result as shown in Table 2, and the C&C domain names in the same category are counted out according to a time sequence in the domain name detection result.

TABLE 2

Domain name detection result

| Time | Apparatus IP address | Domain name | Response IP address | TTL | Category |
|---|---|---|---|---|---|
| 2017-12-12 08:12:17.001 | 192.168.2.118 | www.ggspyfmreouxnhqi.com | null | 0 | banjori |
| 2017-12-12 08:12:17.653 | 192.168.2.118 | www.wyuhdsdttczd.com | null | 0 | banjori |
| 2017-12-12 08:12:17.967 | 192.168.2.118 | mail.pivzovznpssx.com | null | 0 | banjori |
| 2017-12-12 08:12:18.862 | 192.168.2.118 | www.swtjyuhuefvl.com | null | 0 | banjori |
| 2017-12-12 08:12:19.768 | 192.168.2.118 | www.zrkdvzjhse.com | null | 0 | banjori |

TABLE 2-continued

Domain name detection result

| Time | Apparatus IP address | Domain name | Response IP address | TTL | Category |
|---|---|---|---|---|---|
| 2017-12-12 08:12:21.524 | 192.168.2.19 | www.rauggyguyp.com | 208.100.26.251 | 235 | banjori |
| 2017-12-12 08:12:20.662 | 192.168.2.118 | www.wyuhdsdttczd.com | null | 0 | banjori |
| 2017-12-12 08:12:22.325 | 192.168.2.118 | www.furiararji.com | null | 0 | banjori |
| 2017-12-12 08:12:23.219 | 192.168.2.118 | www.pibqzedhzwt.com | null | 0 | banjori |
| 2017-12-12 08:12:24.165 | 192.168.2.118 | www.xjjcditjfkgkihfe.com | null | 0 | banjori |
| 2017-12-12 08:12:29.829 | 192.168.2.118 | www.swtjyuhuefvl.com | null | 0 | banjori |
| 2017-12-12 08:12:34.069 | 192.168.2.118 | www.jsntwyjcv.com | null | 0 | banjori |
| 2017-12-12 08:12:38.172 | 192.168.2.118 | www.xjjcditjfkgkihfe.com | null | 0 | banjori |

Furthermore, it should be noted that the domain name analyzer in the example can identify 28 types of C&C domain names such as banjori.

Figure 3:
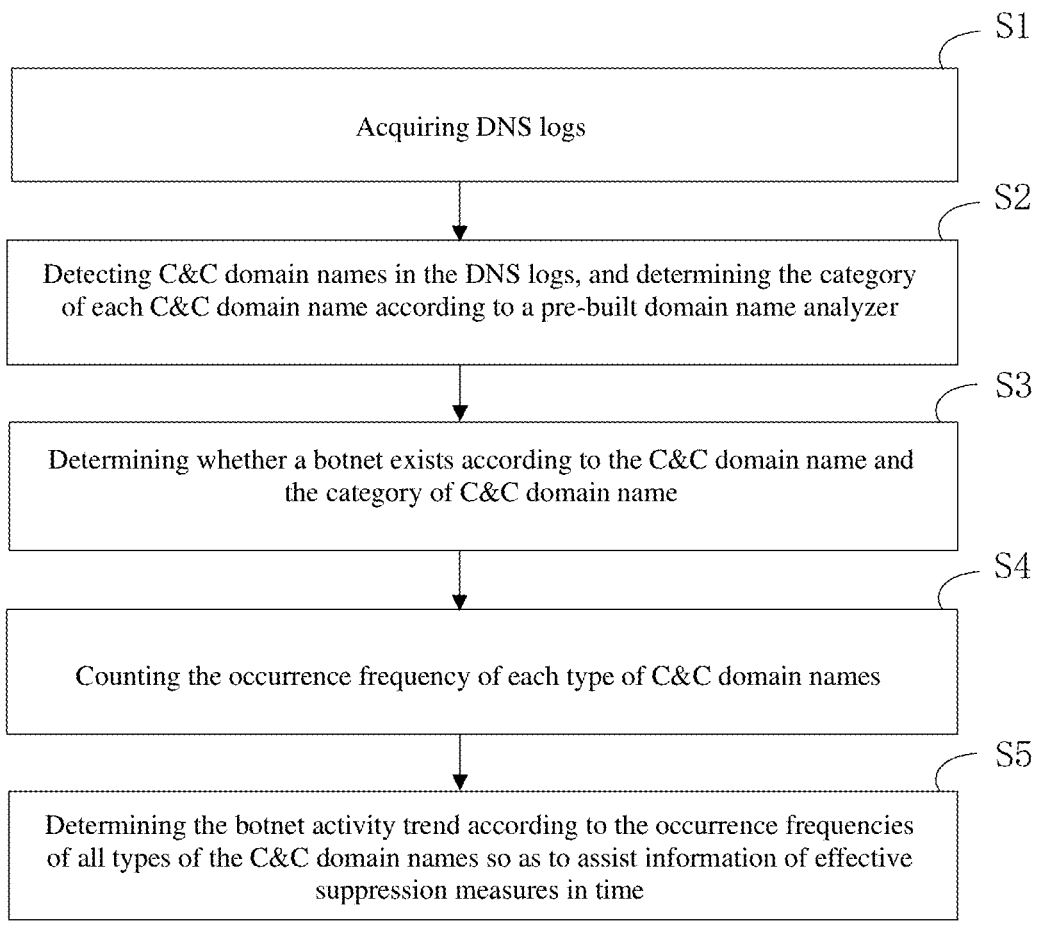
FIG. 3 is another flowchart of the method provided by embodiments of the present invention.

Preferably, as shown in FIG. 3, the method further includes a data statistical step S4, where the occurrence frequency of each type of the C&C domain name is counted; and a trend determination step S5, where the botnet activity trend is determined according to the occurrence frequencies of all types of the C&C domain names so as to assist in formation of effective suppression measures in time.

Specifically, the trend determination step S5 includes substituting the occurrence frequency of each type of the C&C domain name into a Poisson distribution probability function to obtain a Poisson parameter of the corresponding category; determining all the Poisson parameters as a measure of botnet activity; and determining the botnet activity trend according to the measure of botnet activity.

In the example, it is impossible for the botmaster to register all the generated domain names, and only several generated domain names are registered in advance on account of economic costs. A bot must generate similar C&C domain name attempt requests in each cycle in order to establish a connection with a C&C server, until the IP address of the C&C server is acquired. As a result, compared with a normal host, its behavior pattern has distinctive features manifested by the facts that:

(1) A bot requests a large number of new C&C domain names, most of which undergoes a resolution failure;
(2) When multiple parasitic Trojans exist in the network, the domain name request behavior of the bot presents a group behavior characteristic. Since the botmaster has limited server resources, the C&C domain names with successful resolution usually point to the same IP address.

According to the principle of random service system, the occurrence frequency of the C&C server domain name satisfies Poisson distribution. The records extracted from the DNS logs are determined by a C&C domain name detection model, and the occurrence frequency k of the same type of C&C domain names per unit time is counted and substituted into a Poisson distribution probability function to estimate the Poisson parameter $\lambda$ in a certain period, wherein the Poisson distribution probability function is shown as:

$$P(X = k) = \frac{\lambda^k}{k!} e^{-\lambda} \quad (1)$$

In the example, the Poisson parameter is determined as a measure of botnet activity. Table 3 shows a botnet activity trend obtained through analysis.

TABLE 3

Botnet activity trend

| Time interval | Average frequency | Poisson parameter | Category |
|---|---|---|---|
| 01 | 45 | 45 | Banjori |
| 01 | 87 | 87 | Sisron |
| 01 | 0 | 0 | Qadars |
| 02 | 12 | 12 | Banjori |
| 02 | 0 | 0 | Sisron |
| 02 | 0 | 0 | Qadars |
| 03 | 53 | 53 | Banjori |
| 03 | 89 | 89 | Sisron |
| 03 | 36 | 36 | Qadars |
| ... | ... | ... | ... |

In Table 3, any unit time can be used as a statistical time interval, and the average frequency refers to the number of the C&C domain names captured at a current time interval within the period.

Moreover, it should be noted that a bot (IP address and MAC address) with a regular C&C domain name request behavior is determined according to the DNS logs, and a possible attack target of the botnet is easily analyzed according to the role of the bot, so as to form targeted suppression measures in time.

Figure 4:
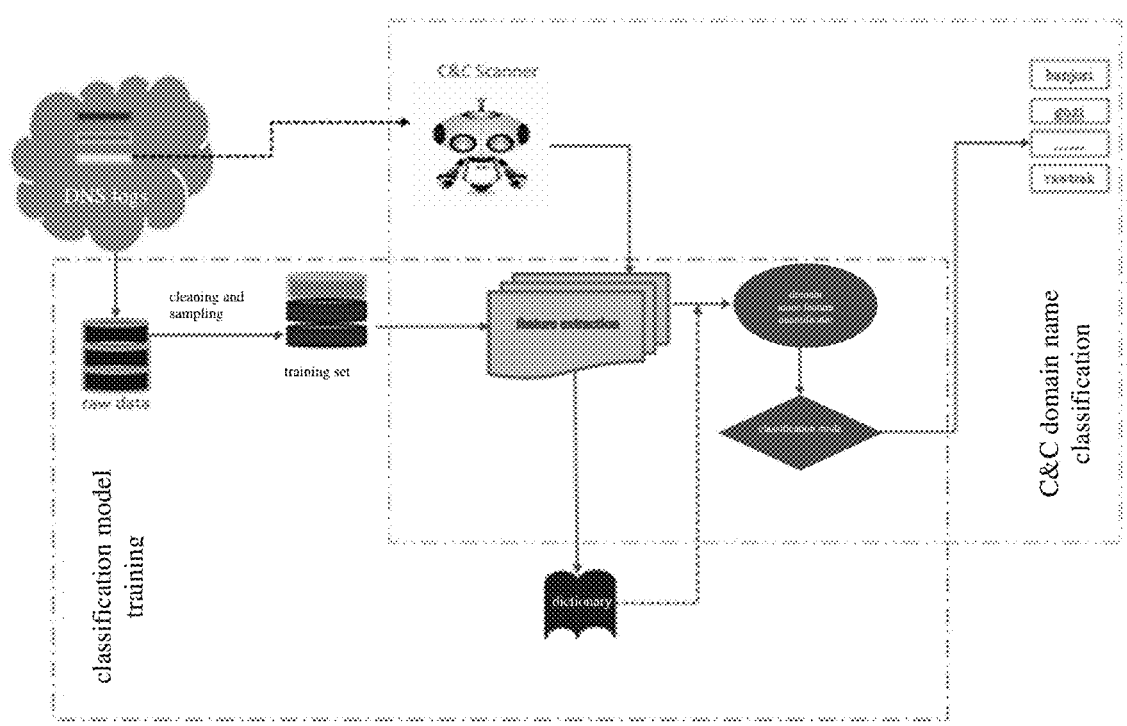
FIG. 4 is a C&C domain name classifying flowchart provided by embodiments of the present invention.

Preferably, as shown in FIG. 4, a training process of the domain name analyzer includes cleaning legitimate domain names published by legitimate websites to obtain a legitimate domain name set; generating a C&C domain name set by a public domain name generation algorithm and classifying and tagging each domain name in the C&C domain name set; statistically analyzing the structure of each domain name in the legitimate domain name set and the C&C domain name set, and establishing a character probability dictionary for each type of the domain names; randomly selecting a given number of legitimate domain names from the legitimate domain name set to obtain a legitimate domain name training sample set; randomly selecting a given number of C&C domain names from the C&C domain name set to obtain a C&C domain name training sample set; and training the domain name analyzer according to the legitimate domain name training sample set, the C&C domain name training sample set and the character probability dictionary.

In the example, the legitimate domain names published by websites such as Alexa are cleaned to obtain 1495163 legitimate domain names, and C&C domain names are obtained by sampling via a public DGA. It should be noted that DGA is a domain generation algorithm and an attacker can use it to generate a pseudorandom character string as a domain name, thereby avoiding blacklist detection. Pseudorandom means that the character string sequence seems to be random, but can be repeatedly generated and duplicated since its structure can be predetermined. The algorithm is usually used in malware and remote control software. In the example, the domain name features are shown in Table 4.

TABLE 4

Domain name feature description

| Feature name | Feature description |
| --- | --- |
| length | host name character string length |
| uni-entropy | host name 1-gram character information entropy |
| uni-probavg | host name 1-gram character average probability |
| bi-entropy | host name 2-gram character information entropy |
| bi-probavg | host name 2-gram character average probability |
| tri-entropy | host name 3-gram character information entropy |
| tri-probavg | host name 3-gram character average probability |
| uni-gram-avgrank | host name 1-gram character average sequence |
| uni-gram-stdrank | host name 1-gram character sequence standard deviation |
| bi-gram-avgrank | host name 2-gram character average sequence |
| bi-gram-stdrank | host name 2-gram character sequence standard deviation |
| tri-gram-avgrank | host name 3-gram character average sequence |
| tri-gram-stdrank | host name 3-gram character sequence standard deviation |
| vowel-ratio | vowel ratio |
| digit-ratio | digit ratio |
| consonant-ratio | consonant ratio |
| consec-consonant | consecutive consonant ratio |
| consec-digit | consecutive digit ratio |
| top1gram-ratio | host name 1-gram letter probability top 10 ratio |
| top2gram-ratio | host name 2-gram character combined probability top 100 ratio |
| top3gram-ratio | host name 3-gram character combined probability top 1000 ratio |

In the example, specifically, the domain name analyzer is a neural network model based on a cumulative BP algorithm, and the neutral network model is provided with a regularization item that comprehensively considers empirical error factors and network complexity factors. In addition, the calculation steps of the neutral network model based on the cumulative BP algorithm include calculating an error target function; describing the neutral network complexity; estimating model parameters by a cross validation process; and adjusting parameters by stochastic gradient descent to approximate the global minimum solution of the error function. In the example, an n-gram (uni-gram, bi-gram, tri-gram) character probability dictionary is established by use of the 1495163 legitimate domain names obtained by cleaning. Furthermore, like each type of C&C domain names, 1000 legitimate domain names are randomly extracted as a training sample set, the cumulative BP algorithm is employed, the part describing the neutral network complexity is added into the error target function, the model parameters are estimated by the cross validation process, and the parameters are adjusted by stochastic gradient descent to approximate the global minimum solution of the error function.

It should be noted that, in the example, features are extracted according to the domain name character registration habit, and the regularization item is added during the model training process with the BP algorithm to compromise between the empirical error and the network complexity, so as to effectively control over-fitting.

Further preferably, as shown in FIG. 4, the domain name analysis step S2 includes extracting a domain name from the DNS logs; subjecting the domain name to feature extraction; determining whether the domain name is a C&C domain name according to the character probability dictionary; subjecting the C&C domain name to domain name feature quantification to obtain the classification number of the C&C domain name; and determining the category of the C&C domain name according to the classification number.

Example 2

Figure 5:
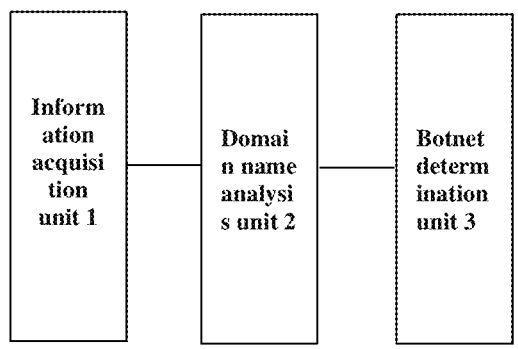
FIG. 5 is a block diagram of the device provided by embodiments of the present invention.

With reference to FIG. 5, the example of the present invention provides a C&C domain name analysis-based botnet detection device. The device comprises an information acquisition unit 1 for acquiring DNS logs; a domain name analysis unit 2 for detecting C&C domain names in the DNS logs and determining the category of each C&C domain name according to a pre-built domain name analyzer; and a botnet determination unit 3 for determining whether a botnet exists according to the C&C domain name and the category of the C&C domain name.

In the C&C domain name analysis-based botnet detection method provided in the example of the present invention, by analyzing the DNS logs, the C&C domain name used in the attack activity is extracted for further analysis of the types of parasitic Trojans to thereby lock down the bot that the C&C server has controlled. In the example, the format of the DNS logs is specifically shown in Table 1.

TABLE 1

| | | DNS logs | | |
|---|---|---|---|---|
| Time | Apparatus IP address | Domain name | Response IP address | TTL |
| 2017-12-12 08:12:15.386 | 192.168.2.14 | mbd.baidu.com | 14.251.177.166 | 55 |
| 2017-12-12 08:12:15.889 | 192.168.2.19 | news.ifeng.com | 125.90.47.177 | 55 |
| 2017-12-12 08:12:16.231 | 192.168.2.110 | www.78.cn | 183.6.224.102 | 55 |
| 2017-12-12 08:12:17.001 | 192.168.2.118 | www.ggspyfmreouxnhqi.com | Null | 0 |
| 2017-12-12 08:12:17.653 | 192.168.2.118 | www.wyuhdsdttczd.com | Null | 0 |
| 2017-12-12 08:12:17.967 | 192.168.2.118 | mail.pivzovznpssx.com | Null | 0 |
| 2017-12-12 08:12:18.862 | 192.168.2.118 | www.swtjyuhuefvl.com | Null | 0 |
| 2017-12-12 08:12:19.768 | 192.168.2.118 | www.zrkdvzjhse.com | Null | 0 |
| 2017-12-12 08:12:20.662 | 192.168.2.118 | www.wyuhdsdttczd.com | Null | 0 |
| 2017-12-12 08:12:21.524 | 192.168.2.19 | www.rauggyguyp.com | 208.100.26.251 | 235 |
| 2017-12-12 08:12:22.325 | 192.168.2.118 | www.furiararji.com | Null | 0 |
| 2017-12-12 08:12:23.219 | 192.168.2.118 | www.pibqzedhzwt.com | Null | 0 |
| 2017-12-12 08:12:24.165 | 192.168.2.118 | www.xjjcditjfkgkihfe.com | Null | 0 |
| 2017-12-12 08:12:24.981 | 192.168.2.14 | tech.meituan.com | 103.37.152.63 | 41 |
| 2017-12-12 08:12:25.824 | 192.168.2.19 | www.iteblog.com | 123.206.77.132 | 53 |
| 2017-12-12 08:12:26.585 | 192.168.2.110 | guanjia.qq.com | 14.215.138.13 | 55 |
| 2017-12-12 08:12:27.186 | 192.168.2.118 | en.wikipedia.org | 198.35.26.96 | 51 |
| 2017-12-12 08:12:28.115 | 192.168.2.118 | www.johannesbader.ch | 162.254.250.112 | 44 |
| 2017-12-12 08:12:29.023 | 192.168.2.14 | us.norton.com | 23.193.116.250 | 53 |
| 2017-12-12 08:12:29.829 | 192.168.2.118 | www.swtjyuhuefvl.com | Null | 0 |
| 2017-12-12 08:12:30.691 | 192.168.2.110 | spark.apache.org | 195.154.151.36 | 50 |
| 2017-12-12 08:12:31.551 | 192.168.2.110 | www.cnblogs.com | 101.37.113.127 | 40 |
| 2017-12-12 08:12:32.384 | 192.168.2.14 | blog.csdn.net | 47.95.165.112 | 35 |
| 2017-12-12 08:12:33.168 | 192.168.2.19 | baike.baidu.com | 180.149.131.247 | 54 |
| 2017-12-12 08:12:34.069 | 192.168.2.118 | www.jsntwyjcv.com | Null | 0 |
| 2017-12-12 08:12:35.011 | 192.168.2.118 | app.tanwan.com | 113.96.154.108 | 55 |
| 2017-12-12 08:12:35.892 | 192.168.2.110 | www.icbc.com.cn | 14.119.125.23 | 55 |
| 2017-12-12 08:12:36.721 | 192.168.2.118 | www.miercn.com | 113.96.154.108 | 55 |
| 2017-12-12 08:12:37.259 | 192.168.2.14 | zs.91.com | 125.77.24.228 | 53 |
| 2017-12-12 08:12:38.172 | 192.168.2.118 | www.xjjcditjfkgkihfe.com | Null | 0 |

In the example, a domain name detection result as shown in Table 2 can be obtained by domain name analysis based on the logs shown in Table 1, and the C&C domain names in the same category are counted out according to a time sequence in the detection result.

TABLE 2

Domain name detection result

| Time | Apparatus IP address | Domain name | Response IP address | TTL | Category |
|---|---|---|---|---|---|
| 2017-12-12 08:12:17.001 | 192.168.2.118 | www.ggspyfmreouxnhqi.com | null | 0 | banjori |
| 2017-12-12 08:12:17.653 | 192.168.2.118 | www.wyuhdsdttczd.com | null | 0 | banjori |
| 2017-12-12 08:12:17.967 | 192.168.2.118 | mail.pivzovznpssx.com | null | 0 | banjori |
| 2017-12-12 08:12:18.862 | 192.168.2.118 | www.swtjyuhuefvl.com | null | 0 | banjori |
| 2017-12-12 08:12:19.768 | 192.168.2.118 | www.zrkdvzjhse.com | null | 0 | banjori |
| 2017-12-12 08:12:21.524 | 192.168.2.19 | www.rauggyguyp.com | 208.100.26.251 | 235 | banjori |
| 2017-12-12 08:12:20.662 | 192.168.2.118 | www.wyuhdsdttczd.com | null | 0 | banjori |
| 2017-12-12 08:12:22.325 | 192.168.2.118 | www.furiararji.com | null | 0 | banjori |
| 2017-12-12 08:12:23.219 | 192.168.2.118 | www.pibqzedhzwt.com | null | 0 | banjori |
| 2017-12-12 08:12:24.165 | 192.168.2.118 | www.xjjcditjfkgkihfe.com | null | 0 | banjori |
| 2017-12-12 08:12:29.829 | 192.168.2.118 | www.swtjyuhuefvl.com | null | 0 | banjori |
| 2017-12-12 08:12:34.069 | 192.168.2.118 | www.jsntwyjcv.com | null | 0 | banjori |
| 2017-12-12 08:12:38.172 | 192.168.2.118 | www.xjjcditjfkgkihfe.com | null | 0 | banjori |

Furthermore, it should be noted that the domain name analyzer in the example can identify 28 types of C&C domain names such as banjori.

Preferably, as shown in FIG. 3, the device further comprises a data statistical unit 4 for counting the occurrence frequency of each type of C&C domain names; and a trend determination unit 5 for determining the botnet activity trend according to the occurrence frequencies of the C&C domain names in all categories, to assist in formation of effective suppression measures in time.

Specifically, the trend determination unit 5 is used for substituting the occurrence frequency of the C&C domain names in each category into a Poisson distribution probability function to obtain a Poisson parameter of the corresponding category; determining all the Poisson parameters as a measure of the botnet activity; and determining the botnet activity trend according to the measure of the botnet activity.

In the example, it is impossible for the botmaster to register all the generated domain names, and only several generated domain names are registered in advance on account of the economic costs. A bot must generate similar C&C domain name attempt requests in each cycle in order to establish a connection with a C&C server, until the IP address of the C&C server is acquired. As a result, compared with a normal host, its behavior pattern has distinctive features manifested by the facts that:
  (1) A bot requests a large number of new C&C domain names, most of which undergoes a resolution failure;
  (2) When multiple parasitic Trojans exist in the network, the domain name request behavior of the bot presents a group behavior characteristic. Since the botmaster has limited server resources, the C&C domain names with successful resolution usually point to the same IP address According to the principle of random service system, the occurrence frequency of the C&C server domain name satisfies Poisson distribution. The records extracted from the DNS logs are determined by a C&C domain name detection model, and the occurrence frequency k of the same type of C&C domain names per unit time is counted and substituted into a Poisson distribution probability function to estimate the Poisson parameter $\lambda$ in a certain period, wherein the Poisson distribution probability function is shown as:

$$P(X = k) = \frac{\lambda^k}{k!}e^{-\lambda} \quad (1)$$

In the example, the Poisson parameter is determined as a measure of botnet activity. Table 3 shows a botnet activity trend obtained through analysis.

TABLE 3

Botnet activity trend

| Time interval | Average frequency | Poisson parameter | Category |
|---|---|---|---|
| 01 | 45 | 45 | Banjori |
| 01 | 87 | 87 | Sisron |
| 01 | 0 | 0 | Qadars |
| 02 | 12 | 12 | Banjori |
| 02 | 0 | 0 | Sisron |
| 02 | 0 | 0 | Qadars |
| 03 | 53 | 53 | Banjori |
| 03 | 89 | 89 | Sisron |
| 03 | 36 | 36 | Qadars |
| . . . | . . . | . . . | . . . |

In Table 3, any unit time can be used as a statistical time interval, and the average frequency refers to the number of the C&C domain names captured at a current time interval within the period.

Moreover, it should be noted that a bot (IP address and MAC address) with a regular C&C domain name request behavior is determined according to the DNS logs, and a possible attack target of the botnet is easily analyzed according to the role of the bot, so as to form targeted suppression measures in time.

Preferably, as shown in FIG. 4, a training process of the domain name analyzer includes cleaning legitimate domain names published by legitimate websites to obtain a legitimate domain name set; generating a C&C domain name set by a public domain name generation algorithm, and classifying and tagging each domain name in the C&C domain name set; statistically analyzing the structure of each domain name in the legitimate domain name set and the C&C domain name set, and establishing a character probability dictionary for each type of domain names; randomly selecting a given number of legitimate domain names from the legitimate domain name set to obtain a legitimate domain name training sample set; randomly selecting a given number of C&C domain names from the C&C domain name set to obtain a C&C domain name training sample set; and training the domain name analyzer according to the legitimate domain name training sample set, the C&C domain name training sample set and the character probability dictionary.

In the example, the legitimate domain names published by websites such as Alexa are cleaned to obtain 1495163 legitimate domain names, and C&C domain names are obtained by sampling via a public DGA. It should be noted that DGA is a domain generation algorithm and an attacker can use it to generate a pseudorandom character string as a domain name, thereby avoiding blacklist detection. Pseudo-random means that the character string sequence seems to be random, but can be repeatedly generated and duplicated since its structure can be predetermined. The algorithm is usually used in malware and remote control software. In the example, the domain name features are shown in Table 4.

In the example, specifically, the domain name analyzer is a neural network model based on a cumulative BP algorithm, and the neutral network model is provided with a regularization item that comprehensively considers empirical error factors and network complexity factors. In addition, the calculation steps of the neutral network model based on the cumulative BP algorithm include calculating an error target function; describing the neutral network complexity; estimating model parameters by a cross validation process; and adjusting parameters by stochastic gradient descent to approximate the global minimum solution of the error function. In the example, an n-gram (uni-gram, bi-gram, tri-gram) character probability dictionary is established by use of the 1495163 legitimate domain names obtained by cleaning. Furthermore, like each type of C&C domain names, 1000 legitimate domain names are randomly extracted as a training sample set, the cumulative BP algorithm is employed, the part describing the neutral network complexity is added into the error target function, the model parameters are estimated by the cross validation process, and the parameters are adjusted by stochastic gradient descent to approximate the global minimum solution of the error function.

It should be noted that, in the example, features are extracted according to the domain name character registration habit, and the regularization item is added during the model training process with the BP algorithm to compromise between the empirical error and the network complexity, so as to effectively control over-fitting.

Further preferably, as shown in FIG. 4, the domain name analysis unit 2 is specifically used for extracting a domain name from the DNS logs; subjecting the domain name to feature extraction; determining whether the domain name is a C&C domain name according to the character probability dictionary; subjecting the C&C domain name to domain name feature quantification to obtain the classification number of the C&C domain name; and determining the category of the C&C domain name according to the classification number.

TABLE 4

Domain name feature description

| Feature name | Feature description |
| --- | --- |
| length | host name character string length |
| uni-entropy | host name 1-gram character information entropy |
| uni-probavg | host name 1-gram character average probability |
| bi-entropy | host name 2-gram character information entropy |
| bi-probavg | host name 2-gram character average probability |
| tri-entropy | host name 3-gram character information entropy |
| tri-probavg | host name 3-gram character average probability |
| uni-gram-avgrank | host name 1-gram character average sequence |
| uni-gram-stdrank | host name 1-gram character sequence standard deviation |
| bi-gram-avgrank | host name 2-gram character average sequence |
| bi-gram-stdrank | host name 2-gram character sequence standard deviation |
| tri-gram-avgrank | host name 3-gram character average sequence |
| tri-gram-stdrank | host name 3-gram character sequence standard deviation |
| vowel-ratio | vowel ratio |
| digit-ratio | digit ratio |
| consonant-ratio | consonant ratio |
| consec-consonant | consecutive consonant ratio |
| consec-digit | consecutive digit ratio |
| top1gram-ratio | host name 1-gram letter probability top 10 ratio |
| top2gram-ratio | host name 2-gram character combined probability top 100 ratio |
| top3gram-ratio | host name 3-gram character combined probability ton 1000 ratio |

Example 3

Figure 6:
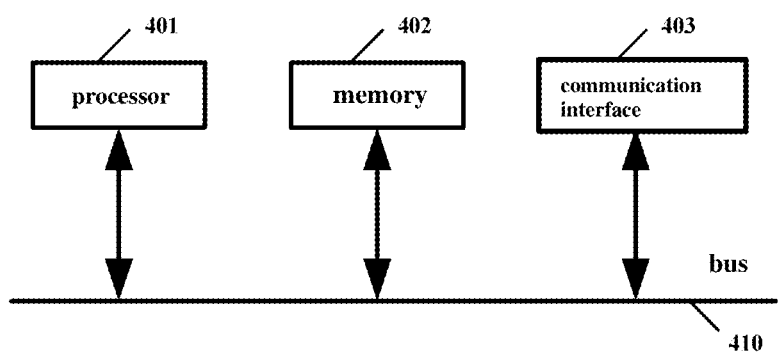
FIG. 6 is a schematic diagram of the hardware structure of the computer apparatus provided by embodiments of the present invention.

The C&C domain name analysis-based botnet detection method in the example of the present invention with reference to FIG. 6 can be implemented by a computer apparatus. FIG. 6 shows a hardware structural diagram of the computer apparatus provided in the example of the present invention.

The computer apparatus for implementation of the C&C domain name analysis-based botnet detection method may comprise a processor 401 and a memory 402 where computer program instructions are stored.

Specifically, the processor 401 may comprise a central processing unit (CPU), or an application specific integrated circuit (ASIC), or one or more integrated circuits capable of being configured to implement the example of the present invention.

The memory 402 may comprise a mass memory for data or instructions. For example, not limitation, the memory 402 may comprise a hard disk drive (HDD), a floppy disk drive, a flash memory, an optical disk, a magneto-optical disk, a magnetic tape, a universal serial bus (USB) drive or a combination of two or more thereof. Under a proper condition, the memory 402 may comprise a removable or non-removable (or fixed) medium. Under a proper condition, the memory 402 may be arranged inside or outside a data processing device. In a specific example, the memory 402 is a non-volatile solid-state memory. In a specific example, the memory 402 comprises a read-only memory (ROM). Under a proper condition, the ROM may be a mask programmable ROM, a programmable ROM (PROM), an erasable PROM (EPROM), an electrically erasable PROM (EEPROM), an electrically alterable ROM (EAROM), a flash memory or a combination of two or more thereof.

The processor 401 reads and runs the computer program instructions stored in the memory 402 to realize any C&C domain name analysis-based botnet detection method in the examples mentioned above.

In one example, the computer apparatus may further comprise a communication interface 403 and a bus 410. As shown in FIG. 4, the processor 401, the memory 402 and the communication interface 403 are connected via the bus 410 to accomplish mutual communication.

The communication interface 403 is mainly used for communication between modules, devices, units and/or apparatuses in the examples of the present invention.

The bus 410 comprises hardware, software or both and couples the parts of the computer apparatus with each other. For example, not limitation, the bus may comprise an accelerated graphics port (AGP) or other graphic buses, an enhanced industry standard architecture (EISA) bus, a front side bus (FSB), a hypertransport (HT) interconnection, an industry standard architecture (ISA) bus, an infiniband interconnection, a low pin count (LPC) bus, a memory bus, a microchannel architecture (MCA) bus, a peripheral component interconnect (PCI) bus, a PCI-Express (PCI-X) bus, a serial advanced technology attachment (SATA) bus, a video electronics standards association local (VLB) bus, other proper buses or a combination of two or more thereof. Under a proper condition, the bus 410 may comprise one or more buses. Although the examples of the present invention describe and show the specific bus, the present invention takes any proper bus or interconnection into consideration.

Example 4

Furthermore, the example of the present invention can provide a computer readable storage medium for implementing the C&C domain name analysis-based botnet detection methods in the examples mentioned above. The computer readable storage medium stores computer program instructions which are executed by a processor to implement any C&C domain name analysis-based botnet detection method in the examples mentioned above.

It should be clarified that the present invention is not limited to the specific configurations and processes described hereinabove and shown in the figures. For simplicity, a detailed description of known methods is omitted herein. In the embodiments mentioned above, several specific steps are described and shown as examples. However, the methods/processes of the present invention are not limited to the specific described and shown steps. Those skilled in the art can make various changes, modifications and additions or change the sequence between the steps once understanding the spirit of the present invention.

The functional blocks shown in the structural block diagram described above can be implemented as hardware, software, firmware or a combination thereof. When implemented as hardware, they can be, for example, electronic circuits, application specific integrated circuits (ASIC), proper firmware, plug-ins, functional cards, etc. When they are implemented as software, the elements of the present invention are programs or code segments for executing required tasks. The programs or code segments can be stored in a machine readable medium, or transmitted in a transmission medium or communication link via data signals in carriers. The machine readable medium may comprise any medium capable of storing or transmitting information. The examples of the machine readable medium include electronic circuits, semiconductor memory apparatuses, ROMs, flash memories, erasable ROMs (EROM), floppy disks, CD-ROMs, optical disks, hard disks, optical fiber media, radio frequency (RF) links, etc. The code segments can be downloaded via a computer network such as Internet and Intranet.

It should also be noted that the exemplary embodiments mentioned in the present invention describe some methods or systems based on a series of steps or devices. However, the present invention is not limited to the sequences of the steps mentioned above, that is, the steps can be performed in the sequences mentioned in the embodiments or sequences different from those in the embodiments, or several steps are performed at the same time.

Hereinabove mentioned are only the specific embodiments of the present invention. Those skilled in the art can clearly understand that no more details about the specific working processes (which can be learnt by reference to the corresponding processes in the foregoing method embodiments) of the systems, modules and units described above are provided herein, for the convenience and conciseness of description. It should be understood that the protection scope of the present invention is not limited thereto, anyone skilled in the art can easily come up with equivalent modifications or replacements within the technical scope disclosed by the present invention, and these modifications or replacements should be covered within the protection scope of the present invention.

Although the present invention has been described to some extent, it is obvious that proper changes can be made to each condition without departing from the spirit and scope of the present invention. It is understood that the present invention is not limited to the embodiments mentioned above, but falls into the scope of the claims, which includes equivalent replacements of each factor.

What is claimed is:

1. A command-and-control domain name analysis-based botnet detection method, comprising:
an information acquisition step, where domain name system logs are acquired;
a domain name analysis step, where command-and-control domain names in the domain name system logs are detected and a category of each command-and-control domain name is determined according to a pre-built domain name analyzer;
a botnet determination step, where whether a botnet exists is determined according to the command-and-control domain name and the category of command-and-control domain name;
a data statistical step, where the occurrence frequency of each type of the command-and-control domain name is counted; and
a trend determination step, where a botnet activity trend is determined according to the occurrence frequencies of all types of the command-and-control domain names so as to assist in formation of effective suppression measures in time, wherein training the domain name analyzer includes the steps of:
cleaning legitimate domain names published by legitimate websites to obtain a legitimate domain name set;
generating a command-and-control domain name set by a public domain name generation algorithm and classifying and tagging each domain name in the command-and-control domain name set;
statistically analyzing a structure of each domain name in a legitimate domain name set and the command-and-control domain name set;
establishing a character probability dictionary for each type of domain names;
randomly selecting a given number of legitimate domain names from the legitimate domain name set to obtain a legitimate domain name training sample set;
randomly selecting a given number of command-and-control domain names from the command-and-control domain name set to obtain a command-and-control domain name training sample set; and
training the domain name analyzer according to the legitimate domain name training sample set, the command-and-control domain name training sample set and a character probability dictionary.

2. The method in claim 1, wherein the trend determination step includes the steps of:
substituting the occurrence frequency of each type of the command-and-control domain name into a Poisson distribution probability function to obtain a Poisson parameter of the corresponding category;
determining all the Poisson parameters as a measure of the botnet activity; and
determining the botnet activity trend according to the measure of the botnet activity.

3. The method in claim 1, wherein: the domain name analyzer is a neural network model based on a cumulative backpropagation algorithm; and a neutral network model is provided with a regularization item that comprehensively considers empirical error factors and network complexity factors.

4. The method in claim 3, wherein calculating the neutral network model based on the cumulative backpropagation algorithm comprises the steps of:
calculating an error target function;
describing neutral network complexity;
estimating model parameters by a cross validation process; and
adjusting parameters by stochastic gradient descent to approximate a global minimum solution of the error function.

5. The method in claim 1, wherein the domain name analysis step includes the steps of: extracting a domain name from the domain name system logs; subjecting the domain name to feature extraction; determining whether the domain name is the command-and-control domain name according to the character probability dictionary; subjecting the command-and-control domain name to domain name feature quantification to obtain a classification number of the command-and-control domain name; and
determining the category of the command-and-control domain name according to the classification number.

6. A computer apparatus, comprising:
at least one processor;
at least one memory; and
computer program instructions stored in the memory, wherein the method in claim 1 is implemented when the computer program instructions are executed by the processor.

7. A non-transitory computer readable storage medium for storing computer program instruction, wherein the method in claim 1 is implemented when the computer program instructions are executed by the processor.

* * * * *